(12) United States Patent
Tassone et al.

(10) Patent No.: US 12,380,276 B2
(45) Date of Patent: Aug. 5, 2025

(54) CAPTURING A SUBJECTIVE VIEWPOINT OF A FINANCIAL MARKET ANALYST VIA A MACHINE-LEARNED MODEL

(71) Applicant: VOXSMART LIMITED, London (GB)

(72) Inventors: Anthony Tassone, Saint Charles, IL (US); Tejas Shastry, Chicago, IL (US)

(73) Assignee: VOXSMART LIMITED, London (GB)

( * ) Notice: Subject to any disclaimer, the term of this patent is extended or adjusted under 35 U.S.C. 154(b) by 554 days.

(21) Appl. No.: 17/448,409

(22) Filed: Sep. 22, 2021

(65) Prior Publication Data

US 2022/0092268 A1    Mar. 24, 2022

Related U.S. Application Data

(60) Provisional application No. 63/081,778, filed on Sep. 22, 2020.

(51) Int. Cl.
| | | |
|---|---|---|
| *G06F 40/30* | (2020.01) | |
| *G06N 5/022* | (2023.01) | |
| *G10L 15/18* | (2013.01) | |
| *G10L 15/22* | (2006.01) | |
| *G06Q 40/06* | (2012.01) | |

(52) U.S. Cl.
CPC ............. *G06F 40/30* (2020.01); *G06N 5/022* (2013.01); *G10L 15/1815* (2013.01); *G10L 15/22* (2013.01); *G06Q 40/06* (2013.01)

(58) Field of Classification Search
CPC ................................ G06N 5/022; G06F 40/30
See application file for complete search history.

(56) References Cited

U.S. PATENT DOCUMENTS

| | | |
|---|---|---|
| 3,296,374 A | 1/1967 | Clapper |
| 7,409,349 B2 | 8/2008 | Wang et al. |
| 7,447,654 B2 | 11/2008 | Ben-Levy et al. |
| 7,475,046 B1 | 1/2009 | Foley et al. |
| 7,533,054 B2 | 5/2009 | Hausman et al. |
| 7,536,335 B1 | 5/2009 | Weston et al. |

(Continued)

FOREIGN PATENT DOCUMENTS

EP    2813983 A1    12/2014

OTHER PUBLICATIONS

Adams, Paige, et al., "Chapter 6: Conversational Thread Extraction and Topic Detection in Text-Based Chat", Semantic Computing, edited by Sheu et al., © 2010 IEEE, pp. 87-113.

(Continued)

*Primary Examiner* — Ibrahim Siddo
(74) *Attorney, Agent, or Firm* — PIERSON FERDINAND LLP; Keats Quinalty (57) ABSTRACT

Systems and methods herein provide for establishing a subjective viewpoint in text. In one embodiment, a method includes identifying intents and metrics in each of a plurality of texts, calculating a sentiment score for each text based on the identified intents and metrics of each text, and calculating a disfluency score for each text to weight the sentiment score of each text. The method also includes training the machine learning model with the texts, and processing a subsequent text through the trained machine learning model to determine a sentiment score of the subsequent text.

20 Claims, 6 Drawing Sheets

(56) References Cited

U.S. PATENT DOCUMENTS

| | | | |
|---|---|---|---|
| 7,610,549 | B2 | 10/2009 | Vignet |
| 7,643,998 | B2 | 1/2010 | Yuen et al. |
| 7,685,048 | B1 | 3/2010 | Hausman et al. |
| 7,689,495 | B1 | 3/2010 | Kim et al. |
| 7,822,672 | B2 | 10/2010 | Hausman |
| 8,019,665 | B2 | 9/2011 | Hausman |
| 8,099,352 | B2 | 1/2012 | Berger et al. |
| 8,321,465 | B2 | 1/2012 | Berger et al. |
| 8,504,483 | B2 | 8/2013 | Foley et al. |
| 8,682,723 | B2 | 3/2014 | Parsons et al. |
| 8,788,397 | B2 | 7/2014 | Berger et al. |
| 8,878,853 | B2 | 11/2014 | Baransky et al. |
| 9,330,659 | B2 | 5/2016 | Ju et al. |
| 9,728,184 | B2 | 8/2017 | Xue et al. |
| 9,760,566 | B2 | 9/2017 | Heck et al. |
| 9,774,553 | B2 | 9/2017 | Krka et al. |
| 9,794,206 | B2 | 10/2017 | Shan et al. |
| 9,870,424 | B2 | 1/2018 | Neystadt et al. |
| 10,417,340 | B2 | 9/2019 | Applegate et al. |
| 10,554,817 | B1 * | 2/2020 | Sullivan .............. H04L 41/5054 |
| 10,586,556 | B2 | 3/2020 | Caskey et al. |
| 10,630,560 | B2 | 4/2020 | Adylov et al. |
| 10,657,962 | B2 | 5/2020 | Zhang et al. |
| 2009/0292638 | A1 | 11/2009 | Hausman |
| 2010/0121880 | A1 | 5/2010 | Ursitti et al. |
| 2011/0270732 | A1 | 11/2011 | Ritter et al. |
| 2013/0081056 | A1 | 3/2013 | Hu et al. |
| 2013/0173247 | A1 | 7/2013 | Hodson |
| 2013/0211880 | A1 | 8/2013 | Kannan et al. |
| 2014/0006248 | A1 | 1/2014 | Toffee |
| 2014/0081823 | A1 | 3/2014 | Phadnis et al. |
| 2014/0114978 | A1 | 4/2014 | Chatterjee et al. |
| 2014/0207651 | A1 | 7/2014 | Toffey et al. |
| 2014/0289249 | A1 | 9/2014 | Davis et al. |
| 2015/0310862 | A1 | 10/2015 | Dauphin et al. |
| 2016/0217488 | A1 | 7/2016 | Ward et al. |
| 2016/0301652 | A1 | 10/2016 | Turski et al. |
| 2017/0132703 | A1 | 5/2017 | Oomman et al. |
| 2018/0006973 | A1 | 1/2018 | Hays et al. |
| 2018/0075147 | A1 | 3/2018 | Bagheri et al. |
| 2018/0233139 | A1 | 8/2018 | Finkelstein et al. |
| 2018/0239495 | A1 | 8/2018 | Sharifi et al. |
| 2019/0108270 | A1 | 4/2019 | Dunne et al. |
| 2019/0121907 | A1 | 4/2019 | Brunn et al. |
| 2019/0318725 | A1 | 10/2019 | Le Roux et al. |
| 2019/0325898 | A1 * | 10/2019 | O'Hart Kinney ....... G10L 15/02 |
| 2020/0159826 | A1 * | 5/2020 | Lev Tov ................. G06F 40/35 |
| 2020/0210907 | A1 | 7/2020 | Ulizio et al. |

OTHER PUBLICATIONS

Elsner, Micha, et al., "Bounding and Comparing Methods for Correlation Clustering Beyond ILP", NAACL HLT Workshop on Integer Linear Programming for Natural Language Processing, Boulder, CO, Jun. 2009, pp. 19-27.

Nicoletti, Maties, et al., "TopChat: encyclopedia-based topic identification from chat logs", ASAI 2011, Cordoba, Argentina, Aug. 29-30, 2011, 12 pages.

Shen, Dou, et al., "Thread Detection in Dynamic Text Message Streams", SIGIR '06, Seattle, WA, Aug. 6-11, 2006, pp. 35-42.

David M. Blei, et al.; "Latent Dirichlet Allocation"; Abstract; Jan. 2003; http://jmlr.csail.mit.edu/papers/v3/blei03a.html.

Liangjie Hong, et al.; "Empirical Study of Topic Modeling in Twitter"; SOMA '10 Proceedings of the First Workshop on Social Media Analytics; Washington DC; Jul. 25-28, 2010; 2 pages.

Micha Elsner, et al.; "Disentangling Chat"; Computational Linguistics; Association for Computational Linguistics; 2010; vol. 36, No. 3; 22 pages.

"Message Mining extracts price quotes from Bloomberg communications for use in applications", bloomberg/ enterprise, 2016, 2 pages.

"AI at Bloomberg", https://www.techatbloomberg.com/ai/, printed Jan. 6, 2021, 9 pages.

* cited by examiner

| Input text | Intent | Entity Label | Entity Value | Word Disfluency | Sentiment |
|---|---|---|---|---|---|
| Orange Reports Second Quarter Results | general | | | 0 | 0.07 |
| Total Revenue Grows, Services Revenue Reaches New All-Time High of $13.3 Billion | revenue | revenue | $13.3B | 0 | 0.57 |

CAPTURING A SUBJECTIVE VIEWPOINT OF A FINANCIAL MARKET ANALYST VIA A MACHINE-LEARNED MODEL

CROSS REFERENCE TO RELATED APPLICATIONS

This patent application claims priority to, and thus the benefit of an earlier filing date from, U.S. Provisional Patent Application No. 63/081,778 (filed Sep. 22, 2020), the contents of which are hereby incorporated by reference as if repeated herein in entirety.

BACKGROUND

Hedge funds and asset management firms (e.g., "buy side" firms) rely on news, earnings transcripts, and/or other research documents to formulate a view on the market and buy and sell securities. However, the vast amount of research information available about a particular market sector or even a single company is generally too large for any single person to review. At the same time, these firms must continue to maximize their ingestion of research to maintain their competitive edge.

Many firms rely on financial analysts employed by investment banks to read through a particular set of research, summarize their findings, and/or present their viewpoints on the market. This analyses typically focus on particular topics and reference key metrics such that an analyst can provide a general sentiment. Even so, the number of financial analysts are numerous, and funds frequently have a set of "trusted curators" whose analyses they rely on.

SUMMARY

Systems and methods herein provide for establishing a subjective viewpoint in text. In one embodiment, a method includes identifying intents and metrics in each of a plurality of texts, calculating a sentiment score for each text based on the identified intents and metrics of each text, and calculating a disfluency score for each said text to weight the sentiment score of each said text. The method also includes training the machine learning model with the texts, and processing a subsequent text through the trained machine learning model to determine a sentiment score of the subsequent text.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles and are included within the scope of the embodiments. Furthermore, any examples described herein are intended to aid in understanding the embodiments and are to be construed as being without limitation to such specifically recited examples and conditions. As a result, the embodiments are not limited to any of the examples described below.

The systems and methods presented herein provide the ability for a "buy side" firm to capture the essence of trusted analysts in a machine learned model and apply that model to new research documents, thus scaling the firm's ability to process research while maintaining the viewpoint of their trusted analysts. Moreover, the embodiments herein objectively score analysts' viewpoints within a set of trusted analysts to increase the quality of research findings.

Figure 1:
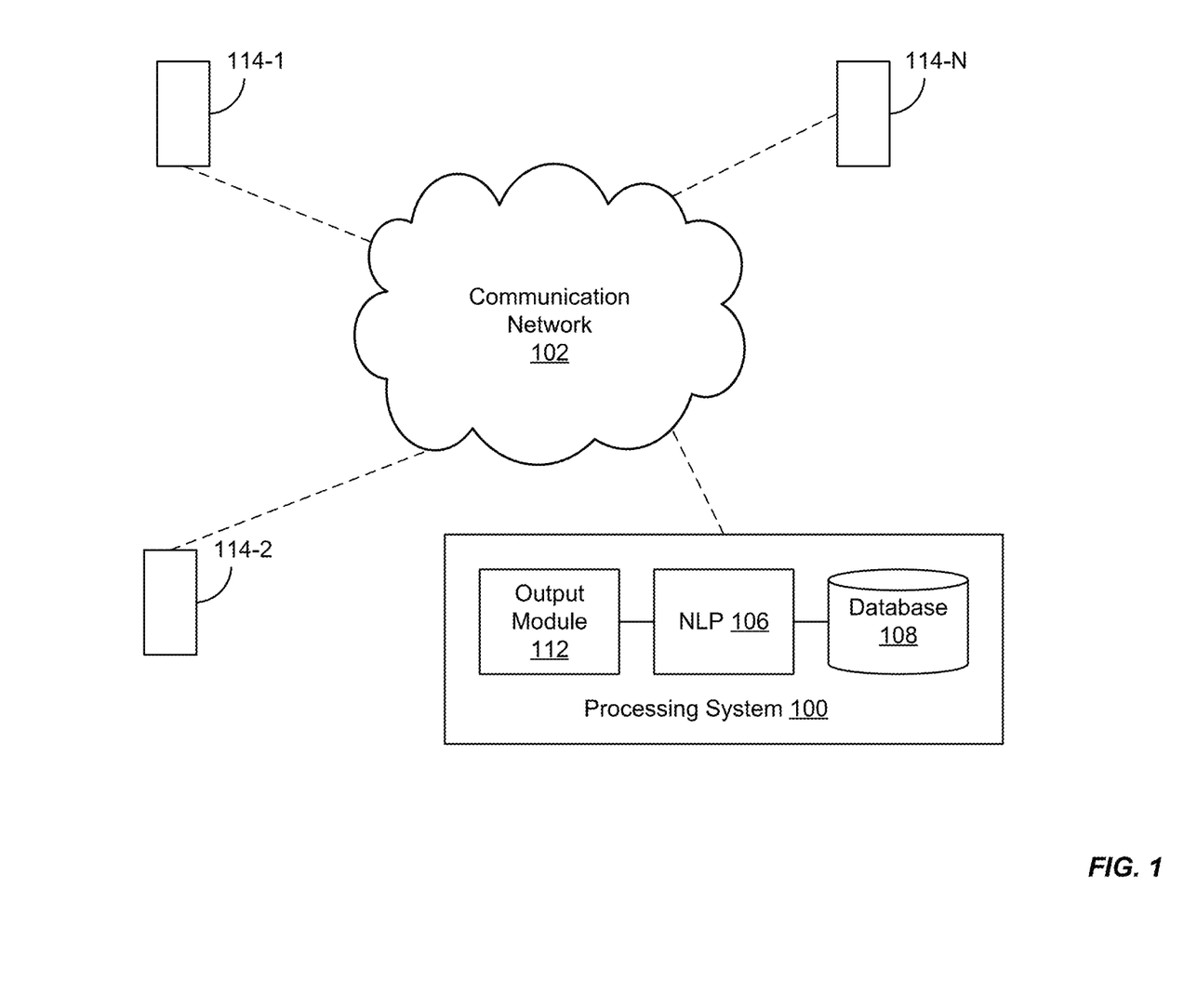
FIG. 1 is a block diagram of an exemplary processing system for establishing a subjective viewpoint of a text with a machine learning model.

FIG. 1 is a block diagram of an exemplary processing system 100 for establishing a subjective viewpoint of text with a machine learning model. In this embodiment, the processing system 100 is operable to process audio communications from a plurality of user devices 114-1 to 114-N (where the reference "N" is an integer greater than "1" and not necessarily equal to any other "N" reference designated herein) and transcribe the audio communications into text so as to determine the viewpoints of the users of those devices 114 (e.g., cell phones). For example, a buy side firm may request an analysis of a stock acquisition from a trusted analyst. The analyst may call into the processing system 100 through a communication network 102 and issue an audio opinion of that stock acquisition. The processing system 100 may then transcribe that audio opinion and evaluate the text to determine the analyst's more likely sentiment regarding that stock acquisition.

In one embodiment, the processing system 100 includes a natural language processor (NLP) 106, a database 108, and an output module 112. The NLP 106 is operable to process the audio from the user devices 114 to transcribe the audio and evaluate the sentiment of the analyst. The NLP 106 is operable to employ machine learning that identifies the sentiment of the analyst. In this regard, the NLP 106 may include a trained machine learning module to process the transcribed audio to evaluate the sentiment of the analyst. For example, the database 108 may include a plurality of texts which have been evaluated to identify various metrics, topics, and/or intents. These identified features may be labeled as part of a supervised learning process and used to calculate a sentiment score of each text. Then, the sentiment score may be weighted using a disfluency score to give an overall sentiment of the text. This information along with the texts may be used to train the machine learning model of the NLP 106 such that, when a subsequent text is received by the NLP 106, the NLP 106 may calculate a sentiment score for the subsequent text and output that score via the output module 112. The NLP 106 may also identify and output the features of the subsequent text (i.e., the metrics, topics, and/or intents).

Generally, the sentiment score is on a scale of −1 to 1, with −1 being most negative and +1 being most positive. The disfluency score is generally a measure of the degree of "fluency" within a given text. For example, repetition, stutters, and filler words, such as uh, um, etc., may be considered disfluencies. These disfluencies in each text may be counted. And, the ratio of disfluencies to the total number of words may be calculated to compute the disfluency score.

Figure 2:
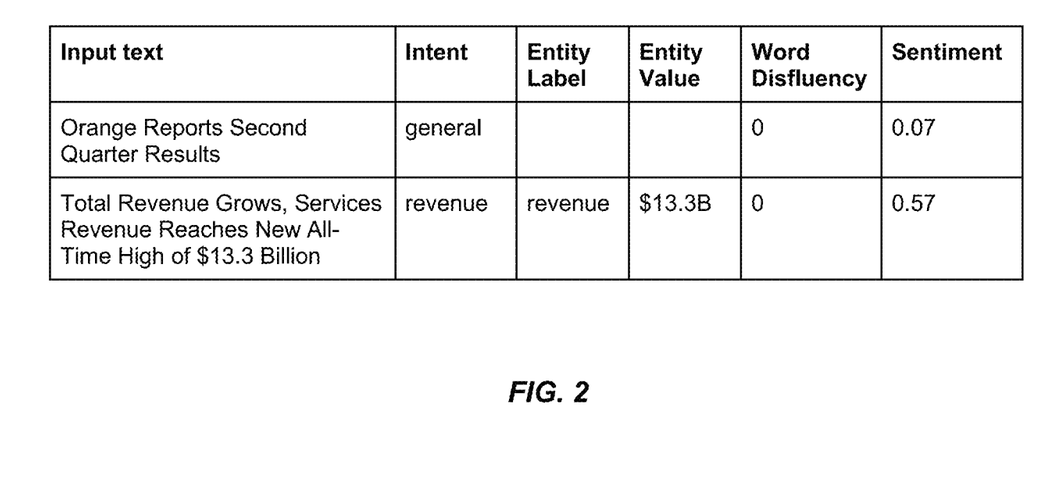
FIG. 2 is a table illustrating an input to a machine learning model, in one exemplary embodiment.

An example of texts that are used to train the machine learning model of the NLP 106 is illustrated in FIG. 2. In this example, two input texts are shown. The texts are labeled with their intents (e.g., general, revenue generating, etc.), the entity type (e.g., undisclosed, revenue generating, market analysis, etc.), values (e.g., a metric), a disfluency score, and a sentiment score. The intent and value may be identified and labeled by a person and/or via another machine learning process. In any case, these texts may be used to train the machine learning model of the NLP 106. Thus, when the NLP 106 processes an incoming audio message from one of the user devices 114, the NLP 106 may transcribe the audio message and process the transcribed audio message through the trained machine learning model of the NLP 106 to identify similar features and generate a sentiment score has described herein.

In some embodiments, in order to train the machine learning model to match the viewpoint of a financial analyst, the analyst may run an example research document through the base model, such as the one described previously. The base model outputs values for intents, entities, and sentiment. The analyst then validates this data for each sentence, adding or removing entities, relabeling intent, and changing the sentiment.

Figure 3:
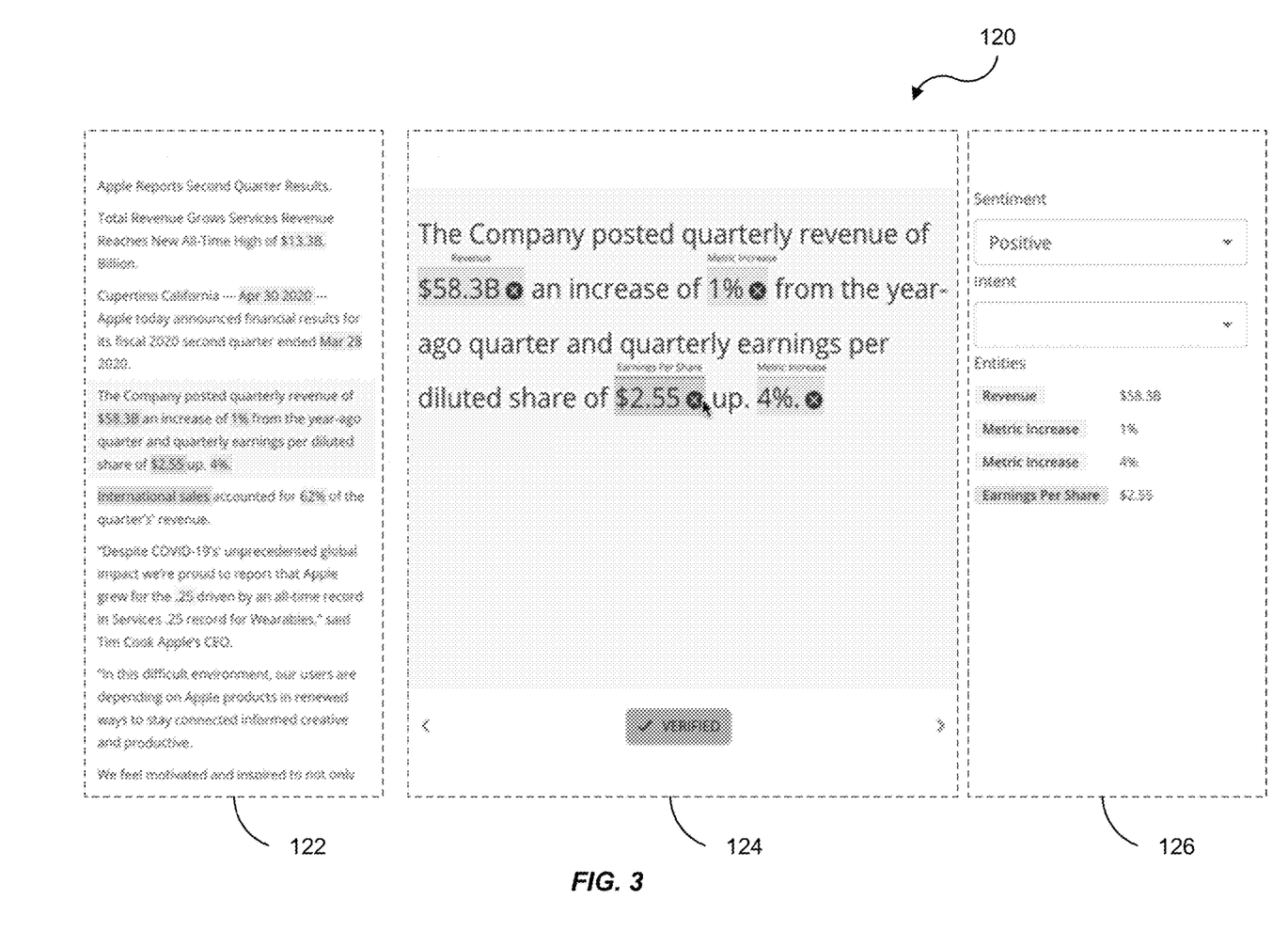
FIG. 3 illustrates intent labels and metrics being identified in a text, in one exemplary embodiment.

FIG. 3 shows an interface 120 of the NLP 106 illustrating how various portions of texts may be labeled with intents, metrics, and the like. For example, one text is illustrated in the text block 122. The NLP 106 may provide an interface 124 to a user to identify and label certain features within the text. Alternatively or additionally, these features may be identified via machine learning as well. Then, after the text of the text block 122 has been labeled, a sentiment score may be computed by the NLP 106 and displayed with the various metrics and labels of the text to the user, e.g., in the window 126. Once the text has been verified, the text may be assigned to the database 108 to train the machine learning model of the NLP 106.

Some examples of machine learning algorithms that may be implemented by the NLP 106 include a supervised learning algorithm, a semi-supervised learning algorithm, an unsupervised learning algorithm, a regression analysis algorithm, a reinforcement learning algorithm, a self-learning algorithm, a feature learning algorithm, a sparse dictionary learning algorithm, an anomaly detection algorithm, a generative adversarial network algorithm, a transfer learning algorithm, and an association rules algorithm.

Figure 4:
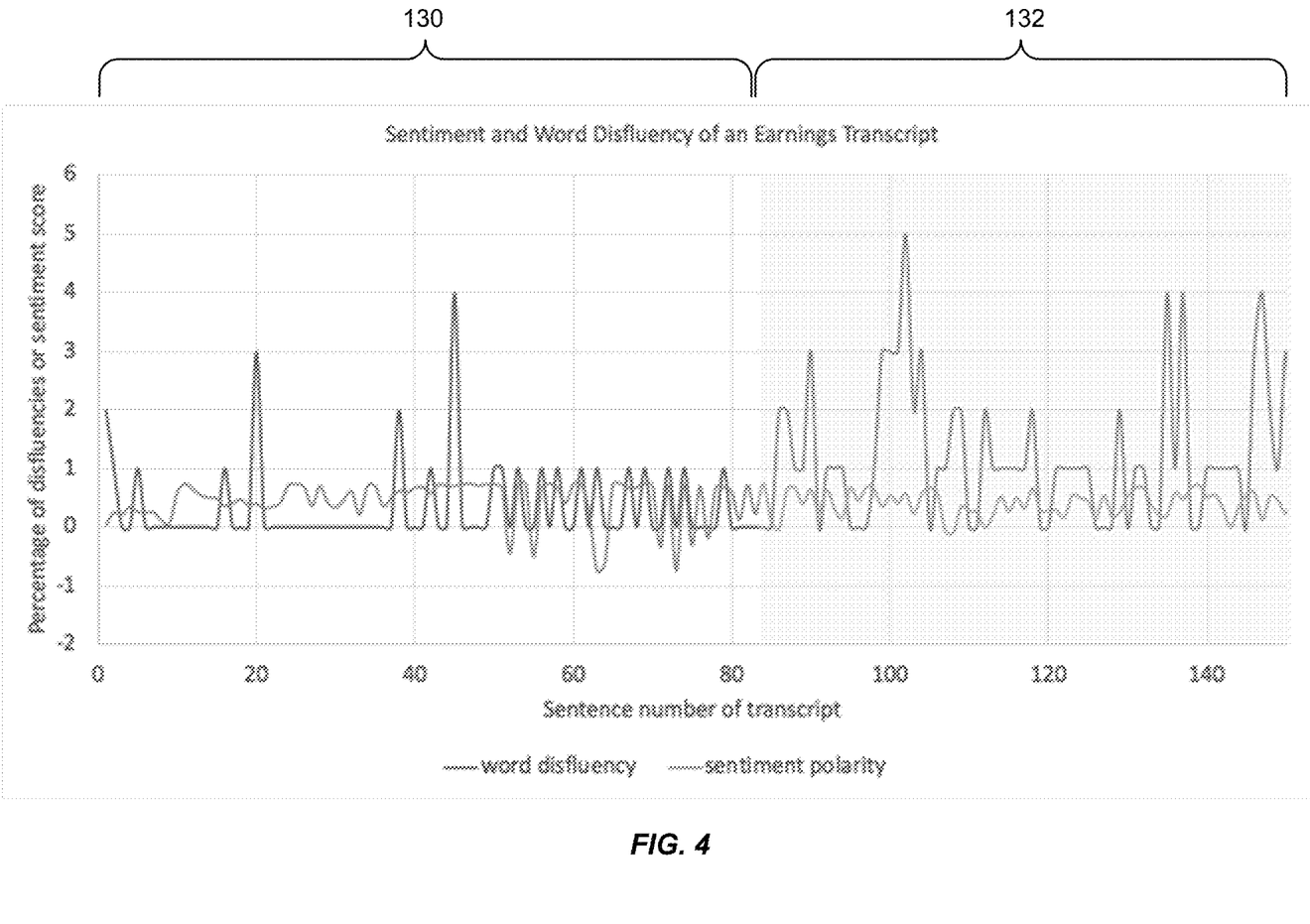
FIG. 4 is a graph illustrating sentiment scoring and disfluency scoring, in one exemplary embodiment.

FIG. 4 shows the sentiment score and word disfluency score output by a trained machine learning model of the NLP 106 on an earnings call transcript. For example, an earnings call is typically divided into two sections—a remarks section 130 and a question and answer (Q&A) section 132. Because remarks during the Q&A section are not prepared, the number of disfluencies is generally much higher. Disfluencies are one measure of the confidence a speaker has in their remarks. A higher percentage of disfluencies indicates less confidence in the speaker's remarks and thus can correlate with more neutral or negative sentiment.

Having the subjective sentiment trained from labeled data and compared to the objective disfluency metric enables a firm to score how well an analyst's NLP model may be tracking to real indications. In this example, the analyst-trained sentiment shows less change during the Q&A section 132 despite the spikes in disfluencies as compared to the prepared remarks. This indicates that the sentiment indicator may not be reliable as the large variance in disfluencies in the Q&A should typically indicate a variance in sentiment. Thus, the disfluency score may be used to weight the sentiment score to provide a more accurate assessment of the sentiment.

Figure 5:
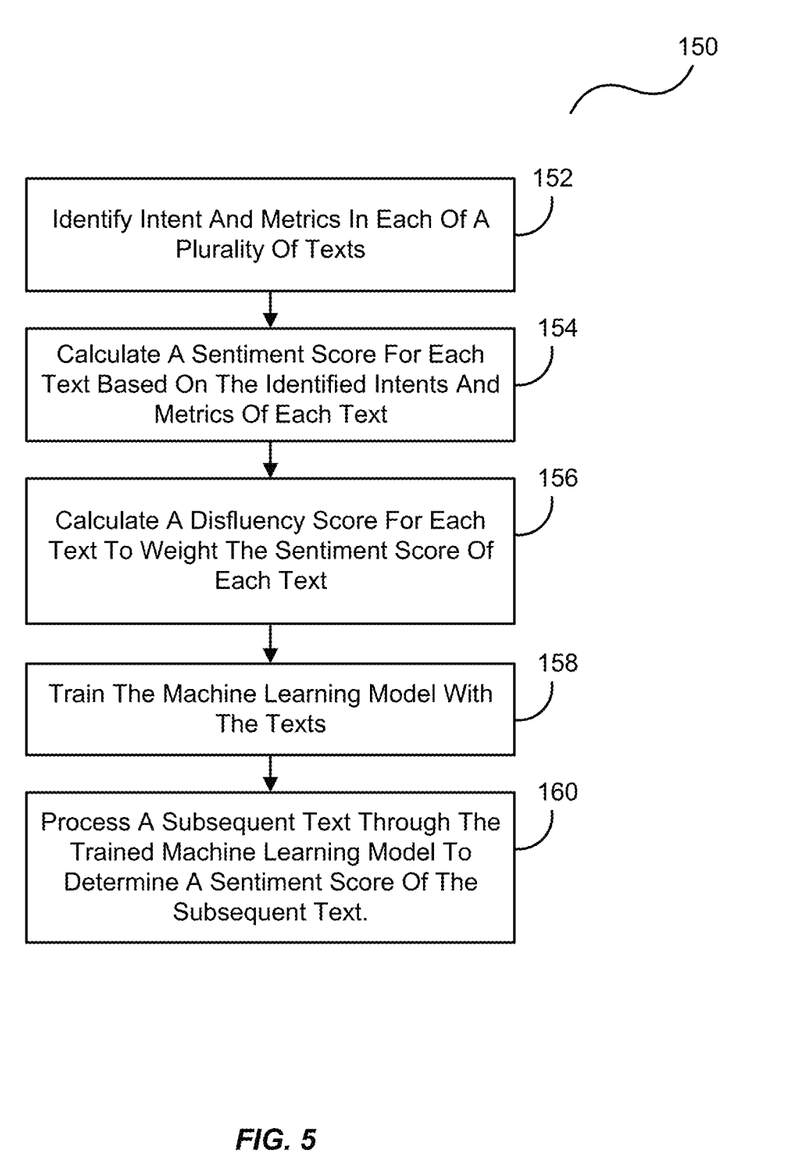
FIG. 5 is a flowchart of an exemplary process of the system of FIG. 1.

FIG. 5 is a flowchart of an exemplary process 150 of the processing system of FIG. 1. In this embodiment, the NLP 106 identifies and labels various intents and metrics of a plurality of texts, in the process element 152. From there, the NLP 106 may calculate a sentiment score for each text based on the identified/labeled features of each text, in the process element 154. From there, the NLP 106 may analyze each text to identify various disfluencies in each of the texts to calculate a disfluency score, in the process element 156, that may be used to weight the sentiment score of each text. From there, the processing system 100 may store the texts in the database 108 and direct the NLP 106 to train the machine learning model with the texts, in the process element 158. Once the machine learning model of the NLP 106 is trained, the NLP 106 may process a subsequent text (e.g., as transcribed by a user device 114) to determine a sentiment score of the subsequent text, in the process element 160.

Figure 6:
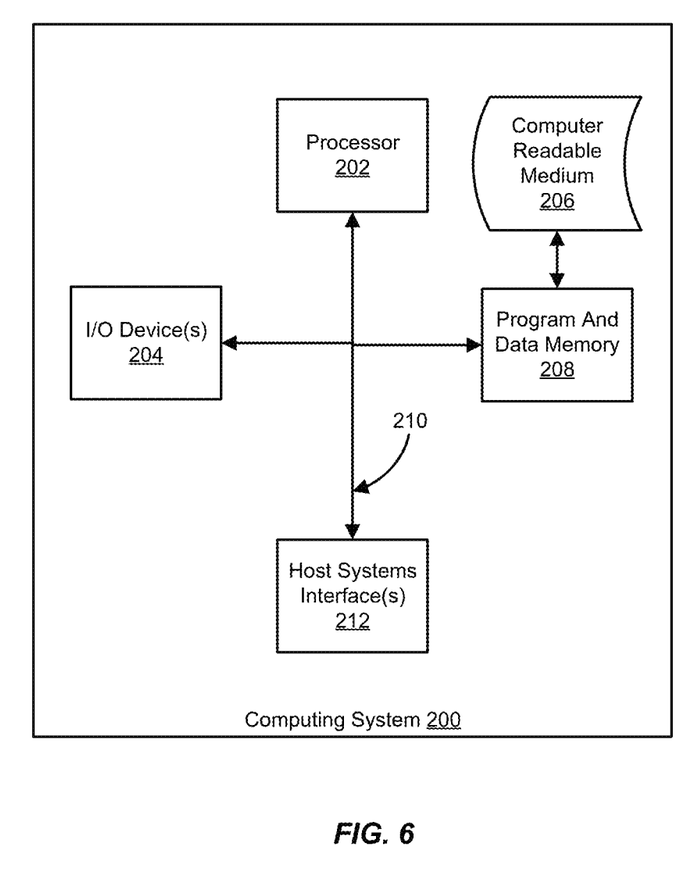
FIG. 6 is a block diagram of an exemplary computing system in which a computer readable medium provides instructions for performing methods herein.

Any of the above embodiments herein may be rearranged and/or combined with other embodiments. Accordingly, the natural language processing concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 6 illustrates a computing system 200 in which a computer readable medium 206 may provide instructions for performing any of the methods disclosed herein.

Furthermore, the embodiments can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk-read/write (CD-R/W) and digital versatile disc (DVD).

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output or I/O devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

The instant description can be understood more readily by reference to the instant detailed description, examples, and claims. It is to be understood that this disclosure is not limited to the specific systems, devices, and/or methods disclosed unless otherwise specified, as such can, of course, vary. It is also to be understood that the terminology used herein is for the purpose of describing particular aspects only and is not intended to be limiting.

The instant description is provided as an enabling teaching of the invention in its best, currently known aspect. Those skilled in the relevant art will recognize that many changes can be made to the aspects described, while still obtaining the beneficial results of the instant description. It will also be apparent that some of the desired benefits of the instant description can be obtained by selecting some of the features of the instant description without utilizing other features. Accordingly, those who work in the art will recognize that many modifications and adaptations to the instant description are possible and can even be desirable in certain circumstances and are a part of the instant description. Thus, the instant description is provided as illustrative of the principles of the instant description and not in limitation thereof.

As used herein, the singular forms "a," "an" and "the" include plural referents unless the context clearly dictates otherwise. Thus, for example, reference to a "device" includes aspects having two or more devices unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects have been disclosed in the foregoing instant description, it is understood by those skilled in the art that many modifications and other aspects of the disclosure will come to mind to which the disclosure pertains, having the benefit of the teaching presented in the foregoing description and associated drawings. It is thus understood that the disclosure is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described disclosure.

What is claimed is:

1. A method of establishing a subjective viewpoint of a text with a machine learning model, the method comprising:
   identifying intents and metrics in each text of a plurality of texts;
   calculating a sentiment score for each said text based on the identified intents and metrics of each said text;
   calculating a disfluency score for each said text;
   weighting the sentiment score of each said text based on the disfluency score;
   training the machine learning model with the plurality of texts to create a trained machine learning model; and
   processing a subsequent text through the trained machine learning model to determine a subsequent text sentiment score of the subsequent text.

2. The method of claim 1, wherein: each said sentiment score is on a scale of −1 to +1, with −1 being most negative and +1 being most positive.

3. The method of claim 1, wherein: identifying the intents and the metrics in each said text of the plurality of texts further comprises identifying the intents and the metrics in each said text of the plurality of texts via supervised learning.

4. The method of claim 1, wherein: the disfluency score is a measure of a degree of fluency within each said text.

5. The method of claim 4, wherein: repetitive words and filler words are identified by the model as disfluencies.

6. The method of claim 5, further comprising: computing a ratio of the disfluencies to a total number of words to calculate the disfluency score for each said text.

7. The method of claim 1, further comprising: transcribing a plurality of speech conversations with a natural language processor to correspondingly generate the plurality of texts.

8. A system for establishing a subjective viewpoint of a text with a machine learning model, the system comprising:
   a database operable to store a plurality of texts that have each been labeled with identified intents and metrics;
   a natural language processor operable to calculate a sentiment score for each text of the plurality of texts based on the identified intent labels and metrics of each said text, calculate a disfluency score for each said text, weight the sentiment score of each said text based on the disfluency score, train the machine learning model with the plurality of texts, and process a subsequent text through the trained machine learning model to determine a subsequent text sentiment score of the subsequent text.

9. The system of claim 8, wherein: each said sentiment score is on a scale of −1 to +1, with −1 being most negative and +1 being most positive.

10. The system of claim 8, wherein: the natural language processor is further operable to identify the intents and the metrics in each said text of the plurality of texts further via supervised learning.

11. The system of claim 8, wherein: the disfluency score is a measure of a degree of fluency within each said text.

12. The system of claim 11, wherein: repetitive words and filler words are identified by the model as disfluencies.

13. The system of claim 12, further comprising: computing a ratio of the disfluencies to a total number of words to calculate the disfluency score for each said text.

14. The system of claim 8, wherein: the natural language processor is further operable to transcribe a plurality of speech conversations to correspondingly generate the plurality of texts.

15. A non-transitory computer readable medium comprising instructions that, when executed by a processor, direct the processor to implement a machine learning model and to establish a subjective viewpoint of a text with the machine learning model, the instructions further directing the processor to:
- identify intents and metrics in each text of a plurality of texts;
- calculate a sentiment score for each said text based on the identified intents and metrics of each said text;
- calculate a disfluency score for each said text;
- weight the sentiment score of each said text based on the disfluency score;
- train the machine learning model with the plurality of texts to create a trained machine learning model; and
- process a subsequent text through the trained machine learning model to determine a subsequent text sentiment score of the subsequent text.

16. The non-transitory computer readable medium of claim 15, wherein: each said sentiment score is on a scale of −1 to +1, with −1 being most negative and +1 being most positive.

17. The non-transitory computer readable medium of claim 15, further comprising instructions that direct the processor to: identify the intents and the metrics in each of the plurality of texts further via supervised learning.

18. The non-transitory computer readable medium of claim 15, wherein: the disfluency score is a measure of a degree of fluency within each said text.

19. The non-transitory computer readable medium of claim 18, wherein: repetitive words and filler words are identified by the model as disfluencies.

20. The non-transitory computer readable medium of claim 19, further comprising instructions that direct the processor to: compute a ratio of the disfluencies to a total number of words to calculate the disfluency score for each said text.

* * * * *